United States Patent [19]

Stanton et al.

[11] Patent Number: 5,258,892
[45] Date of Patent: Nov. 2, 1993

[54] MOLDED-IN ANTENNA WITH SOLDERLESS INTERCONNECT

[75] Inventors: Stephen M. Stanton, Lauderhill; Rudy Yorio, Boca Raton, both of Fla.

[73] Assignee: Motorola, Inc., Schaumburg, Ill.

[21] Appl. No.: 824,137

[22] Filed: Jan. 22, 1992

[51] Int. Cl.⁵ .............................................. H05K 7/12
[52] U.S. Cl. ..................... 361/814; 343/702; 379/428; 379/420; 379/430; 379/433; 455/90; 455/347; 455/351; 361/728; 361/736; 361/752
[58] Field of Search ............... 361/392, 395, 399, 400, 361/422, 394; 455/351, 89, 90, 347; 343/702; 379/428, 429, 430, 433

[56] References Cited

U.S. PATENT DOCUMENTS

| | | | |
|---|---|---|---|
| 4,092,698 | 5/1978 | Brefka | 361/399 |
| 4,123,756 | 10/1978 | Nagata et al. | 343/702 |
| 4,894,663 | 1/1990 | Urbish et al. | 455/351 |
| 4,926,291 | 5/1990 | Sarraf | 361/392 |
| 5,001,603 | 3/1991 | Villaneuva, III et al. | 361/399 |
| 5,030,963 | 7/1991 | Tadama | 343/702 |
| 5,148,350 | 9/1992 | Chan et al. | 361/399 |
| 5,150,282 | 9/1992 | Tomura et al. | 361/395 |
| 5,166,868 | 11/1992 | Stanton et al. | 361/422 |
| 5,170,173 | 12/1992 | Krenz et al. | 343/702 |

FOREIGN PATENT DOCUMENTS

| | | | |
|---|---|---|---|
| 1-321738 | 12/1989 | Japan | 455/90 |
| 0944039 | 12/1963 | United Kingdom | 361/400 |

Primary Examiner—Leo P. Picard
Assistant Examiner—D. Sparks
Attorney, Agent, or Firm—Juliana Agon

[57] ABSTRACT

A communication device (10) includes a loop antenna (18) that is located within a molded portion of the housing (14) of the communication device, and an electrical contact (20) for the antenna that also provides a mechanical support for at least a portion of the communication device (10).

10 Claims, 3 Drawing Sheets

MOLDED-IN ANTENNA WITH SOLDERLESS INTERCONNECT

TECHNICAL FIELD

This invention relates generally to radio communications devices and more specifically to radio communications devices using molded housings.

BACKGROUND

Small size is desirable in personal radio communications devices such as cordless telephone handsets. However, small size creates problems with the space available for the electronics of the radio communications devices. These space problems, in turn, impose size restrictions on the radio components. For example, antennas may require certain amounts of space within radio communications devices. Thus, a need exists for space-saving components and techniques for personal communication equipment.

SUMMARY OF THE INVENTION

Briefly, according to the invention, a communication device includes a loop antenna that is located within a molded portion of the housing of a communication device, and an electrical contact for the antenna that also provides a mechanical support for at least a portion of the communication device.

DETAILED DESCRIPTION OF THE PREFERRED EMBODIMENT

Figure 1:
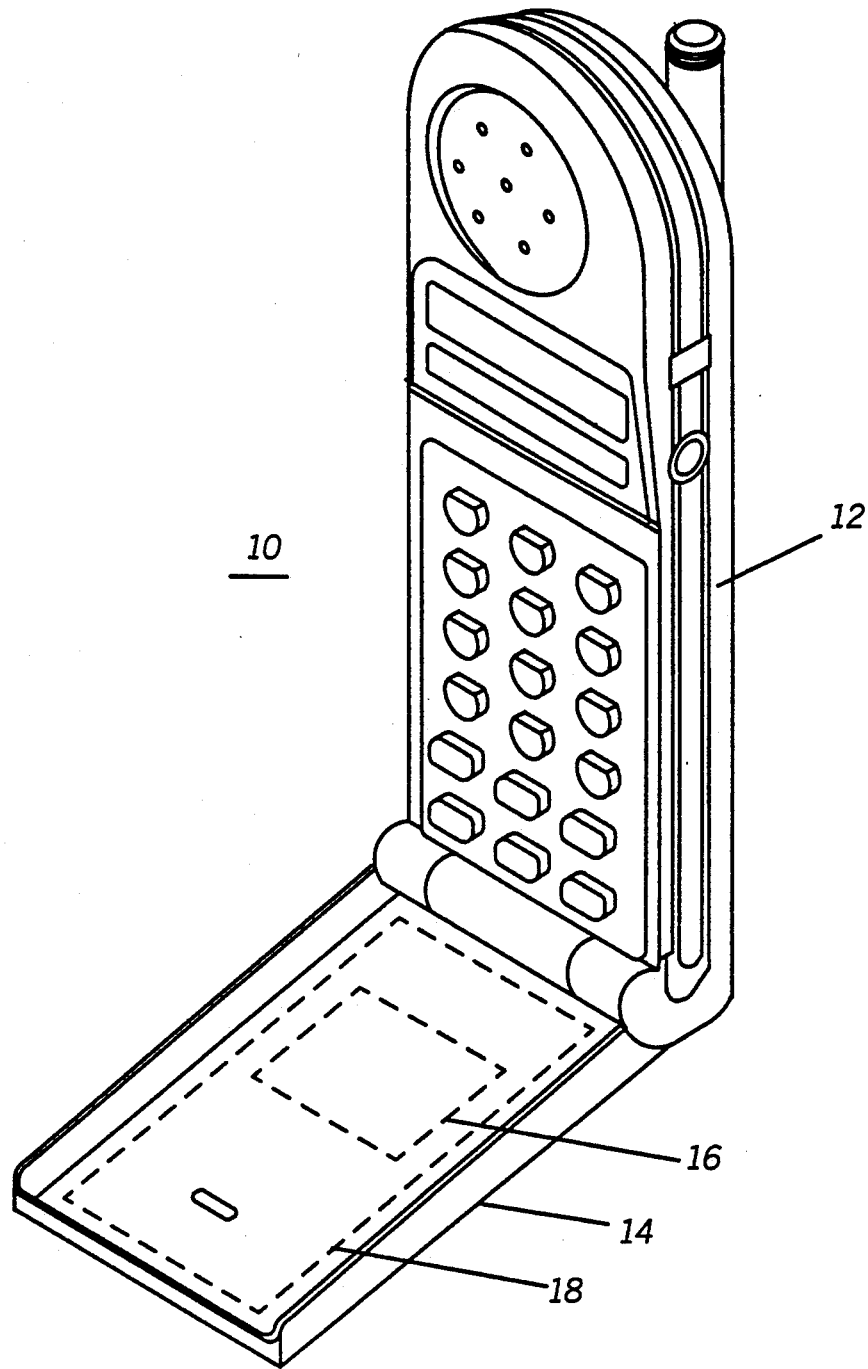
FIG. 1 is an oblique view of a personal communication device in accordance with the invention.

Referring to FIG. 1, there is shown an oblique view of a personal communication device 10 in accordance with the invention. The personal communication device 10 is preferably a second generation cordless telehone (CT2) handset, including a pager. The personal communication device 10 includes a main housing 12 and a flap housing 14. The flap housing 12 includes a receiver (pager) printed circuit board (PCB) 16 (shown in broken lines), and a loop antenna 18 (also shown in broken lines) for the pager.

In accordance with the invention, the antenna 18 is located within the interior of the body of the flap housing 14. This can be accomplished by molding the flap housing out of polyetherimide (e.g., ULTEM TM, or an equivalent high temperature plastic). The housing 14 is plated with a copper undercoat which is then coated with Sulfamate Nickel and a top coat of Tin. The housing 14 is then inserted into a mold and overmolded with Polycarbonate, or an equivalent plastic with decorative characteristics.

Figure 2:
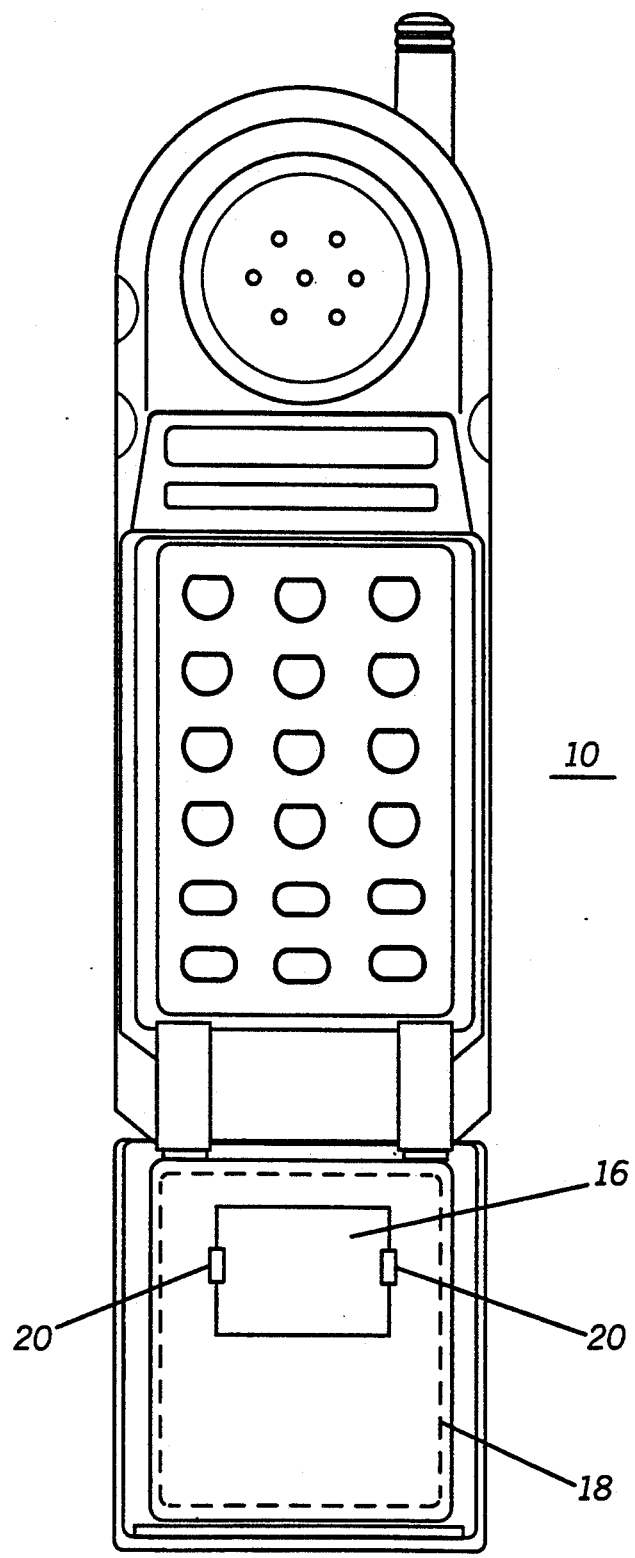
FIG. 2 is a top view of the personal communication device of FIG. 1, showing the interior of a flap portion of the personal communication device.

Referring to FIG. 2, there is shown a top view of the personal communication device 10, showing the interior of the flap housing 14. A pair of snap contacts 20 provide both mechanical support for the PCB 16 and an electrical connection between the antenna 18 and conducting portions of the PCB 16. The antenna 18 is still shown in broken lines because it has been encased in the flap housing 14.

Figure 3:
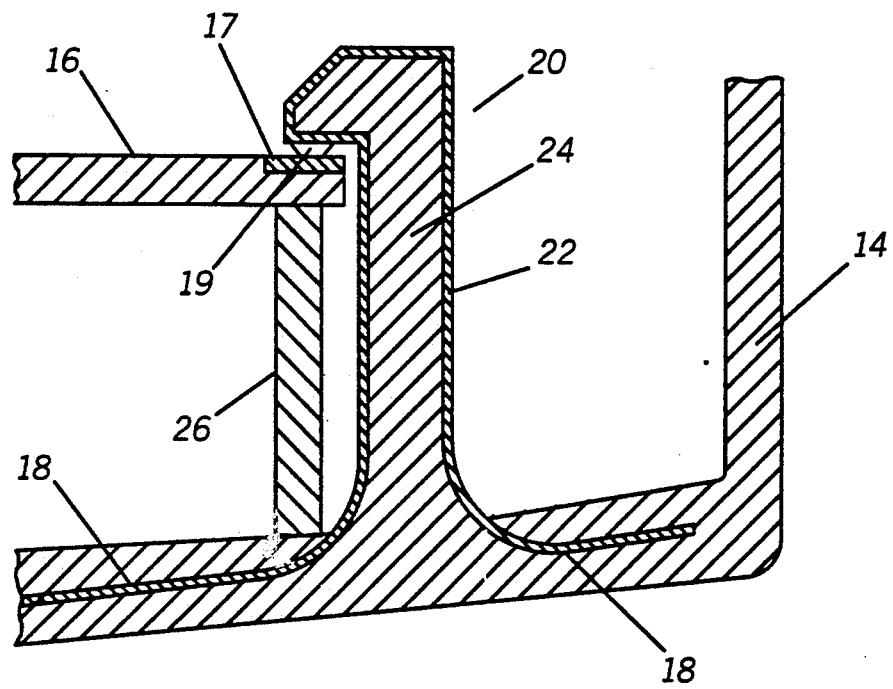
FIG. 3, is a cross-section of the flap portion of the personal communication device.

Referring to FIG. 3, there is shown a cross-section of the flap housing 14. The snaps 20 each comprise a shaft portion 24 that is part of the plated frame and protrude beyond the housing 14. The snap 20 also comprises a conductive coating 22 (i.e., the top coat of Tin). Thus, when the receiver PCB 16 is inserted into the snaps 20, they provide electrical contact between the pager receiver PCB and the antenna 18, and retain the pager PCB in place within the housing 14. A protrusion (i.e., a resilient conductive bump) 19 provides a spring fit (i.e., the snap) to assure a good solderless electrical contact with metallic pads 17 on the PCB 16 and good mechanical support. The upward support for the PCB 16 is provided by a pylon 26 (which may also be a part of the molded housing 14).

Depending on the need and the shape of the housing, this overmolding process could be used to also supply shielding to receiver PCBs by having an polyetherimide shaped can also molded in the correct locations of the housing.

An alternative method for providing mechanical support for the radio receiver PCB 16 electrical contact between the radio receiver PCB and the antenna 18 comprises the following steps:

(1) molding a housing frame from a first plastic material (e.g., polyetherimide, or a similar plastic that can handle a plating process and overmolding);

(2) plating the housing frame with a first metal alloy such as a Copper alloy, with a Gold coat (Gold is desirable for low contact resistance due to the snap features for connecting and holding the receiver PCB 16); and (3) inserting the housing frame in mold and a covering the housing frame with a second plastic material, such as Polycarbonate, for decorative purposes; and (4) forcing the radio receiver PCB 16 into the snap support means 20.

Yet another method for providing a mechanical support for the PCB 16, and an electrical contact between the PCB 16 and the antenna 18, comprises the steps of:

(1) inserting a metal frame (i.e., the antenna) in a mold;

(2) molding the housing frame, from a first plastic material, to embed the metal frame (the housing frame comprises the snap support means 20); and (3) inserting the housing frame into a mold, covering the housing frame with a second plastic material.

Due to the shape of the housing, the loop antenna can be active in two planes perpendicular to each other, thus greatly increasing antenna performance, regardless of how the communication unit 10 is carried. Moreover, by including the antenna within the flap housing 14 no space within the cavity portion of the housing (i.e., where the PCB 16 is located) is used up.

What is claimed is:

1. A communication device comprising:
   a radio receiver circuit board;
   a housing for housing the radio receiver circuit board; and
   an antenna layered within the housing and coupled to the radio receiver circuit board;
   the housing comprising a first snap member for providing a solderless first electrical contact between the radio receiver circuit board and the antenna, wherein the first snap member comprises an outer electrically conductive layer, continous with the antenna, for providing the first electrical contact; and the housing comprising a first support member for supporting the radio receiver circuit board and biasing the receiver circuit board towards the first snap member.

2. The communication device of claim 1, further comprising:

a second snap member disposed on the housing and located opposite the first snap member for providing a second solderless electrical contact between the radio receiver circuit board and the antenna, wherein the second snap member comprises an outer electrically conductive layer for providing the second electrical contact; and a second support member disposed on the housing and located opposite the first support member for supporting the radio receiver circuit board and biasing the receiver circuit board towards the second snap member.

3. The communication device of claim 1, wherein the outer electrically conductive layer comprises a resilient conductive protrusion.

4. The communication device of claim 3, wherein the radio receiver circuit board has a conductive pad for engagement with the resilient conductive protrusion, in order to make either one of the first and second electrical contacts between the antenna and conducting portions of the radio receiver circuit board.

5. The communication device of claim 3, wherein the communication device comprises a cordless telephone handset.

6. The communication device of claim 5, wherein the housing comprises a flap of the cordless telephone handset.

7. The communication device of claim 6, wherein the radio receiver circuit board comprises a pager insertable within the flap of the cordless telephone handset.

8. The communication device of claim 7, wherein the periphery of the antenna is embedded near and follows the periphery of the flap and is distanced vertically away from the pager.

9. The communication device of claim 1, wherein; the housing is molded from a first plastic material; and the antenna is a plated loop antenna plated on the first plastic material and overmolded with a second plastic material.

10. The communication device of claim 1, wherein the communication device comprises a cordless telephone handset having its own handset antenna distinct from the layered antenna.

* * * * *